W1 = 123 Wdg
W2 = 3350 Wdg
W3 = 16 Wdg

United States Patent Office 3,357,328
Patented Dec. 12, 1967

3,357,328
CAMERA VIEWFINDER WITH FRAME-LIMIT INDICATION
Gotthard Kinder and Werner Schacht, Braunschweig, Germany, assignors to Voigtlander A.G., Braunschweig, Germany, a corporation of Germany
Filed Mar. 30, 1965, Ser. No. 443,928
Claims priority, application Germany, Apr. 8, 1964, V 25,755
8 Claims. (Cl. 95—11)

ABSTRACT OF THE DISCLOSURE

A camera having a viewfinder provided with frame limits images of which are clearly visible even under conditions where the intensity of the ambient light is so low that normal daylight exposures cannot be made and instead only flash exposures, for example, can be made. A pair of frame limit indicators coact with the viewfinder for respectively providing congruent frame limit indications, and one of these indicators will provide its frame limit indications under daylight conditions while the other indicator will be used in the case where there is insufficient daylight to provide readily visible frame indications with the daylight frame indicator. An electroluminescent plate coacts with the second frame limit indicator for illuminating the latter when this electroluminescent plate is energized, and the camera carries a source of potential and a means for optionally connecting the source of potential to the electroluminescent plate for illuminating the second frame limit indicator at the option of the operator.

---

This invention relates to cameras.

In particular, the present invention relates to camera viewfinders, and especially to the problem of providing for use with camera viewfinders an indication of the framing limits which of course indicate, as is well known, the limits of the field which will be reproduced in the photograph.

Where cameras are to be used under conditions where the surrounding light intensity is relatively low, as, for example, conditions where a flash assembly is provided to achieve sufficient illumination, or with a camera which is provided with a particularly powerful optical system for properly exposing a film under low-lighting conditions, it is not always possible to clearly see the frame-limit indications where only daylight is relied upon for illuminating such frame-limit indicating structure. It is conventional with cameras of this type to rely solely upon the surrounding lighting conditions for sufficient light to direct into the viewfinder conditions for sufficient light to direct into the viewfinder images of the framing limits, and where there is not very much light available, as under conditions where a flash assembly will be used, it is not possible for the operator to clearly see the framing limits when looking through the viewfinder because of the fact that the surrounding light intensity is insufficient to provide bright enough images of the framing limits.

It is therefore a primary object of the present invention to provide for a camera of the above type a structure which will guarantee a bright and easily visible frame-limiting indication, even under conditions where the light intensity is so low that, for example, a flash apparatus would have to be used to provide a proper exposure.

In addition, it is an object of the present invention to provide a structure of this type which will be capable of using daylight for providing a good frame-limiting indication where the daylight is sufficiently intense for this purpose, while at the same time being capable of providing a sufficiently bright frame-limiting indication under those conditions where the intensity of the surrounding daylight is insufficient by itself to provide bright frame-limiting images.

Yet another object of the present invention is to provide a structure of this type which is exceedingly simple and compact, so that the requirements placed upon the available space in the camera are not unduly strained because of the presence of the structure of the invention.

In addition, it is an object of the present invention to provide a structure of the above type which, when it does use a source of potential, requires so little power that any source of potential which is already in the camera for any other purpose can be used for the purposes of the present invention without any appreciable reduction in the power of the source of potential.

Primarily, the structure of the invention includes a fairly conventional indicating means for providing frame-limiting indications to be used conjointly with the use of the viewfinder of the camera, and in accordance with the present invention an electroluminescent plate means cooperates with this indicating means to illuminate the latter when the electroluminescent plate means is energized. A source of potential is provided for energizing the electroluminescent plate means, and means is provided to enable the operator to optionally connect the source of potential to the electroluminescent plate means for energizing the latter at the option of the operator.

The invention is illustrated by way of example in the accompanying drawings, which form part of the application and in which.

Figure 1:
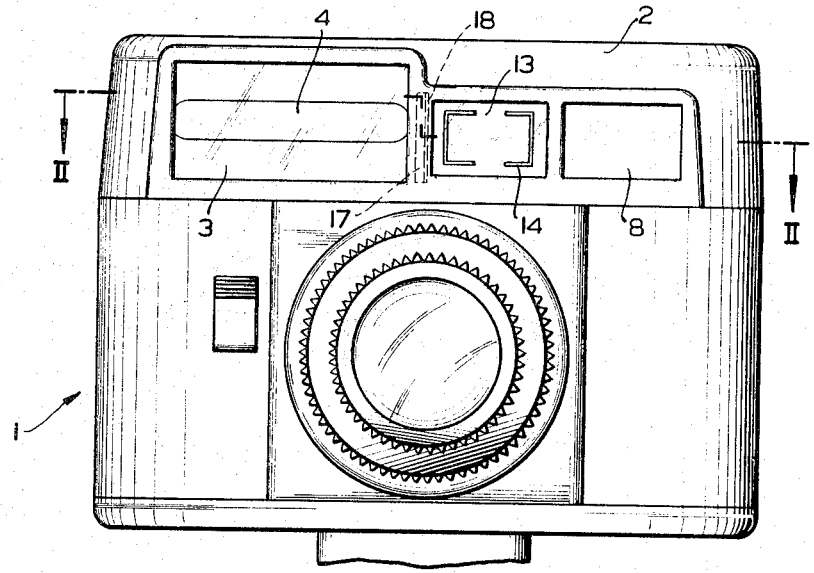
FIG. 1 is a front schematic view of a camera according to the present invention.
Figure 2:
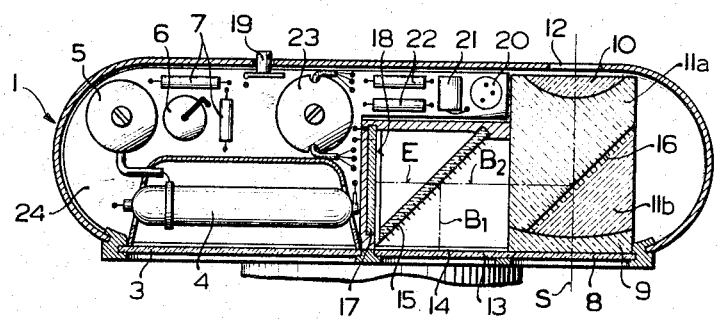
FIG. 2 is a horizontal sectional plan view of the structure of FIG. 1 taken along line II—II of FIG. 1 in the direction of the arrows.

Referring now to FIGS. 1 and 2, the camera 1 illustrated therein includes a flash assembly for providing flash illumination. This flash assembly includes an elongated flash tube 4 situated behind a window 3 in the hollow cap 2 which is situated on the housing of the camera in a well known manner. The camera housing and cap form a support means for the various components of the camera. Within this cap 2 is also situated the conventional components of the flash assembly such as the ignition device 5, the ignition capacitor 6, and the resistors 7.

In addition, the cap 2 of the camera serves to house a conventional viewfinder means made up of a front window 8 behind which is situated a concave lens 9. The rear of the viewfinder means includes an ocular formed by a convex lens 10, and the lenses 9 and 10 are cemented to a pair of glass bodies 11a and 11b so as to form with the latter a single unitary block structure. The image seen by the operator through the window 8 can be observed at the viewing aperture 12.

The object which is to be photographed is imaged for the operator when the operator looks along the light beam S through the viewfinder, and an indicating means is provided for also providing along the light beam S an image of framing limits which will indicate the limits of the field which will be reproduced in the photograph, as is well known. This indicating means for providing frame-limit indications includes, in the illustrated example, a window 13 situated beside the viewfinder window 8 and situated at the front of the cap 2 so as to be exposed to the surrounding daylight conditions. This window 13 carries a mask 14 provided with a pair of substantially U-shaped cutouts having the configuration indicated in FIG. 1, so that when the light passes through these cutouts of the opaque mask 14, it will be possible to use this light to provide frame-limit images. However, the reverse arrangement where the window 13 simply carries a pair of U-shaped indicating elements having the configuration of the cutouts of the mask could also be used.

Behind the indicating means 13, 14 is situated a mirror 15 which reflects the light which reaches the mirror 15 along the light path B₁ so as to direct this light along the path B₂ (FIG. 2), and it will be noted that this latter light path B₂ intersects the light beam S. The interface 16 where the elements 11a and 11b engage each other takes the form of a semitransparent reflector, and it will be seen that the light rays B₂ and S intersect each other at the semitransparent reflector 16. Therefore, the operator will be provided, in a well known manner, with an image of the indicating means 14, and this latter image will be visible to the operator while the operator views the object through the viewfinder means.

In accordance with the present invention, a second indicating means is provided for providing frame-limiting images for the operator when the operator views the object through the viewfinder. This second indicating means is capable of being illuminated by an electroluminescent plate means situated beside and directly next to the second indicating means, so that when the electroluminescent plate means is energized it will illuminate the second indicating means. In the illustrated example, the electroluminescent plate means is arranged on the side of the semitransparent mirror 15 opposite from the window 13 and the electroluminescent plate means and window 13 are symmetrically arranged with respect to the semitransparent reflector 15 which biescts the angle defined between the electroluminescent plate means and the window 13. The electroluminescent plate means 17 takes the form of a transparent plate carrying a layer of phosphor which when energized by an alternating current will become luminescent in a well known manner, and the entire area of the plate 17 will glow upon energizing of the electroluminescent plate means (actually a luminous capacitor) by the alternating current. The second indicating means takes the form, in the illustrated example, of an opaque mask 18 situated directly next to and against the electroluminescent plate means 17, and this mask 18 is formed with cutouts matching those of the mask 14, so that precisely the same frame-limiting images will be derived from illumination of the mask 18 as from illumination of the mask 14 with daylight passing through the window 13. Because of the symmetrical arrangement of the pair of indicating means with respect to the semitransparent mirror 15, the light providing the frame-limiting images from the mask 18 will be directed along the path E which coincides with the path B₂, so that irrespective of which one of the pair of indicating means is used to provide the frame-limiting indications, perfectly congruent indications will be provided from the pair of indicating means, respectively. Thus, because the configuration and size of the cutouts formed in the mask 18 are identical with the configuration and size of the cutouts formed in the mask 14, the frame-limiting images provided from one indicating means will coincide exactly with those provided by the other indicating means.

Under ordinary daylight conditions of sufficient light intensity the electroluminescent plate means 17 of the invention will remain unenergized and the operator will be provided with frame-limiting images from the mask 14. However, underlow-light conditions where a sufficiently bright image cannot be achieved in this way, the operator has the option of energizing the electroluminescent plate means, and a suitable source of potential is provided for this purpose. In the illustrated example, this source of potential is the very same source which is used for energizing the flash assembly. A manually operable switch 19 is accessible to the operator, and this switch is normally open. When the operator chooses to energize the electroluminescent plate means 17, he will simply close the switch 19 and thus connect the phospor layer in an alternating current circuit which will provide the energizing of the electroluminescent plate means 17 in a well known manner. Of course, the particular source of potential used for the flash assembly of the camera will by itself provide a direct current, but a conventor or interruptor is provided to change this direct current into an alternating current or a pulsating type of direct current. For this purpose it is preferred to use a transistorized DC convertor 20 indicated in FIG. 2 as well as in the wiring diagram of FIG. 3. The electrical components for energizing the electroluminescent plate also include a capacitor 21 connected in parallel with the electroluminescent plate 17, as well as a pair of resistors 22 and a transformer 23, connected together in the manner indicated in FIG. 3. The electrical components 5–7 of the flash assembly and the electrical components 19–23 for energizing the electroluminescent plate 17 are preferably mounted on a common plate 24 of electrically nonconductive material, and preferably the plate 24 carries a printed circuit.

Figure 3:
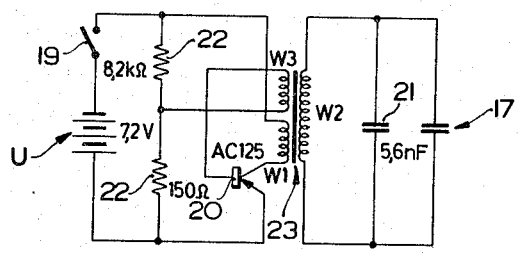
FIG. 3 is a wiring diagram of the structure of the invention.

The electrical components of the wiring diagram of FIG. 3 have the same reference characters as the physical illustration of these electrical components in FIG. 2. Moreover, FIG. 3 indicates the electrical ratings of the various components for the particular example illustrated. The source of current U is the battery of the flash assembly. However, the invention is not limited to this particular example, and the electroluminescent plate means of the invention can be used to illuminate frame-limiting marks or masks which are imaged in the field of the viewfinder in any other suitable manner.

For example, it is possible to construct the electroluminescent plate means itself in the form of a suitable frame mounted directly in the viewfinder and capable of being energized at the option of the operator, so that in this way no mask need by provided in association with the electroluminescent plate means. Furthermore, the mask 18 can be removable mounted in the camera, so that one mask 18 carrying one set of frame limits of a suitable size and configuration can be exchanged for another mask 18 carrying frame limits of a different size and configuration.

Furthermore, it is possible to provide for one mask 18 a plurality of sets of frame limits so that the operator will see in the viewfinder a plurality of frame-limiting indicating images, and the operator will know from the particular objective which is used with the camera which particular set of frame-limiting images are to be used.

Of course, the invention is of full utility even with cameras which do not have a built-in flash assembly. The problem of rendering the frame-limiting indications easily visible under low-lighting conidtions comes up also, for example, with cameras which have very powerful optical systems capable of providing good images under low-lighting conditions. In such case, it is possible to provide a special source of current for the electroluminescent plate means.

Of course, it is particularly desirable to use the invention with a camera which includes a source of potential for a purpose other than energizing the electroluminescent plate means of the invention. For example, with a camera having a built-in light meter of the type which uses a photo-sensitive resistor, or with a camera which is electrically driven for the purpose of advancing the film or which has an electrical drive for automatically setting the camera to make a proper exposure under the particular lighting conditions, or even with a camera which is capable of electrically adjusting the objective, there will in any event be a source of potential which can also be used for the puropses of the present invention. In all of these cases the particular source of potential which is normally required for the camera and which takes the form of a conventional battery can also be used at the same time to supply the energy for the electroluminescent plate means of the invention.

Of course, all of the above-described details as well as those shown in the drawings can be combined together in any desirable manner.

Thus, with the structure of the invention when there is insufficient daylight for providing a clear image of the frame-limiting marks, the electroluminescent plate means can be energized simply by closing the switch 19, and the power consumption of the electroluminescent plate means is so small that a small battery present for another purpose will suffice for the purposes of the electroluminescent plate means without any noticeable drain of the power from such a small battery.

Of course, the indications provided by the use of the electroluminescent plate means will not be very useful during bright daylight conditions, so that under these latter conditions the conventional daylight indicating structure will provide proper frame-limiting images.

It is particularly to be noted that except for the semitransparent reflector 15 which is used primarily with the indicating means 14, all of the structure for imaging the frame-limits of both indicating means is identical, so that an extremely simple and compact construction is provided. Moreover, this construction guarantees that equally sharp images of both indicating means will be provided in the field of the viewfinder.

Of course, the invention is particularly useful with cameras which have built-in flash assemblies, inasmuch as it is precisely with cameras of this type that the problem of frame-limiting indications which are difficult to see because of poor lighting conditions are encountered. Therefore, it is particularly useful to include the structure of the invention in a camera which has a built-in flash apparatus, and the source of current for the flash assembly can be used for the purposes of the present invention without any undesirable drain of energy from this source of power.

What is claimed is:

1. In a camera, support means, viewfinder means for viewing the object which is to be photographed, indicating means cooperating with said viewfinder means for indicating the framing limits of the object to be photographed, electroluminescent plate means coacting with said indicating means for illuminating the indication of the framing limits by said indicating means when said electroluminescent plate means is energized, a source of potential, and means for optionally connecting said source of potential to said plate means for energizing the latter at the option of the operator, said viewfinder means, indicating means, plate means, source of potential, and means for optionally connecting the latter to said plate means all being carried by said support means.

2. In a camera, viewfinder means for viewing the object to be photographed, a pair of indicating means cooperating with said viewfinder means for providing, respectively, congruent frame limit indications, one of said indicating means providing its frame limit indications under daylight conditions and the other of said indicating means beng used when there is insufficient daylight to provide readily visible frame indications with said one indicating means, electroluminescent plate means coacting with said other indicating means for illuminating the latter when said plate means is energized, a source of potential, and means optionally connecting said source of potential to said plate means for illuminating said other indicating means at the option of the operator.

3. In a camera as recited in claim 2, said one indicating means including a window situated beside said viewfinder means for being exposed to the outer lighting conditions and a semitransparent mirror situated behind said window for directing an image of the latter to said viewfinder means, said other indicating means being situated at the side of said mirror opposite from said window for directing an image of the framing limits of said other indicating means through said semitransparent mirror to said viewfinder means, and said mirror being symmetrically situated with respect to said window, on the one hand, and said other indicating means on the other hand.

4. In a camera as recited in claim 1, said indicating means including an opaque masking plate formed with cutouts corresponding to said framing limits, and said electroluminescent plate means being situated next to said masking plate and, when energized, illuminating an area substantially corresponding to that of said masking plate.

5. In a camera as recited in claim 4, said masking plate being removable from its location next to said electroluminescent plate means so as to be replaceable by another masking plate carrying different frame-limiting cutouts.

6. In a camera as recited in claim 4, said masking plate carrying sets of cutouts corresponding to framing limits of different sizes.

7. In a camera, viewfinder means for viewing the object which is to be photographed, indicating means cooperating with said viewfinder means for indicating the framing limits of the object to be photographed, electroluminescent plate means coating with said indicating means for illuminating the indication of the framing limits by said indicating means when said electroluminescent plate means is energized, a source of potential, means for optionally connecting said source of potential to said plate means for energizing the latter at the option of the operator, and an electrically operated assembly independent of said electroluminescent plate means, said source of potential being connected both to the latter assembly and said plate means so as to provide energy for said assembly and said plate means.

8. In a camera as recited in claim 7, said assembly being a flash assembly for providing flash illumination.

References Cited

UNITED STATES PATENTS

| 2,780,129 | 2/1957 | Wood | 88—1.5 |
| 2,908,806 | 10/1959 | Cohen | 240—2.25 X |
| 3,017,815 | 1/1962 | Keznickl | 95—44 |
| 3,057,249 | 10/1962 | Miles | 88—1.5 |
| 3,212,422 | 10/1065 | Nerwin et al. | 95—44 |
| 3,264,930 | 8/1966 | Koeppe | 88—1.5 |

NORTON ANSHER, *Primary Examiner.*

FRED L. BRAUN, *Assistant Examiner.*